US006658839B2

(12) United States Patent
Hebert

(10) Patent No.: US 6,658,839 B2
(45) Date of Patent: Dec. 9, 2003

(54) CONVERGENT/DIVERGENT SEGMENTED EXHAUST NOZZLE

(75) Inventor: Leonard J. Hebert, Kirkland, WA (US)

(73) Assignee: The Boeing Company, Chicago, IL (US)

(*) Notice: Subject to any disclaimer, the term of this patent is extended or adjusted under 35 U.S.C. 154(b) by 77 days.

(21) Appl. No.: 10/087,582

(22) Filed: Feb. 28, 2002

(65) Prior Publication Data
US 2003/0159428 A1 Aug. 28, 2003

(51) Int. Cl.[7] .............................. F02K 1/46; F02K 31/12
(52) U.S. Cl. .................... 60/204; 60/226.1; 60/264; 181/213
(58) Field of Search ........................... 60/226.1, 204, 60/264; 239/265.19; 181/213

(56) References Cited

U.S. PATENT DOCUMENTS 5,771,681 A * 6/1998 Rudolph .................. 60/262
6,314,721 B1 * 11/2001 Mathews et al. .......... 60/264
6,360,528 B1   3/2002 Brausch et al.
6,487,848 B2 * 12/2002 Zysman et al. ............ 60/262
6,532,729 B2 * 3/2003 Martens .................. 60/204

FOREIGN PATENT DOCUMENTS

GB     2 289 921 A  * 12/1995  ............. F02K/1/46

* cited by examiner

Primary Examiner—Ehud Gartenberg
(74) Attorney, Agent, or Firm—Harness Dickey & Pierce P.L.C.

(57) ABSTRACT

A segmented exhaust nozzle for attenuating noise from a jet engine without adversely impacting the operability or operability limit related performance of the engine. The exhaust nozzle includes spaced apart fan nozzle inner and outer walls which form an annular exhaust gas flow path therebetween. The fan nozzle outer wall is segmented at the downstream end. The outer wall curves inwardly towards the inner wall and then turns back away from the inner wall to form an arcuate protrusion that extends into the exhaust gas flow path forming an aerodynamic throat. Through the segmented portion of the nozzle, the outer wall then continues to curve away from the inner wall before again curving back towards the inner wall at a nozzle exit station. The nozzle exit effective area is approximately equal in cross sectional area to a conventional exhaust nozzle exit area. The inwardly curving and then segmented outwardly curving portion of the exhaust nozzle forms a geometric influction that serves to reduce noise without negatively affecting engine operability or operability limit related performance.

14 Claims, 3 Drawing Sheets

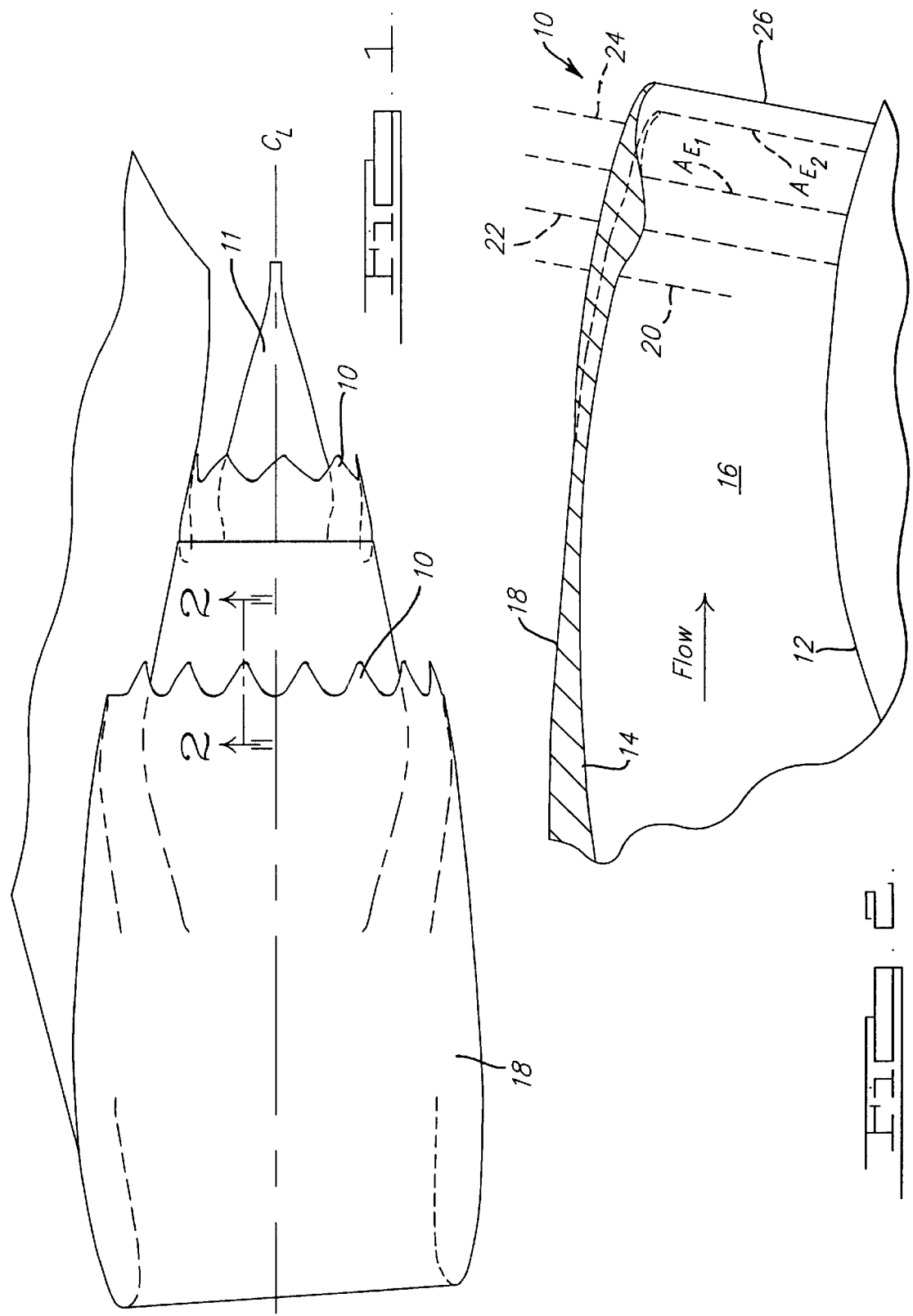

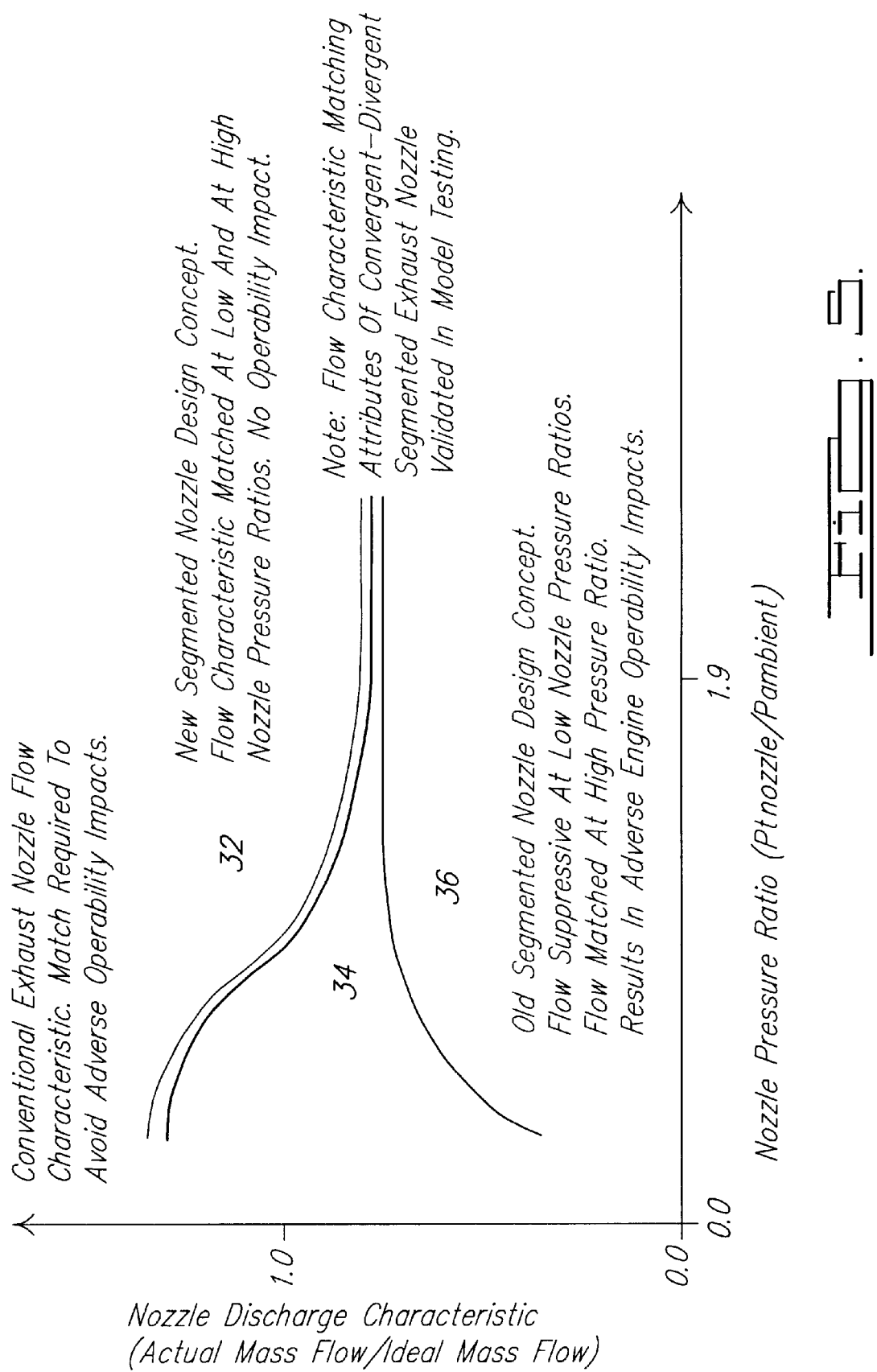

CONVERGENT/DIVERGENT SEGMENTED EXHAUST NOZZLE

FIELD OF THE INVENTION

This invention relates to exhaust nozzles used with turbofan engines, and more particularly to an exhaust nozzle used with a turbofan jet engine for reducing the noise of the exhaust gasses emitted from the engine without suppressing the flow of exhaust gasses through the exhaust nozzle.

BACKGROUND OF THE INVENTION

The reduction of exhaust flow jet noise from turbofan aircraft engines is essential to meeting current and anticipated future government regulatory requirements for Airplane Type Certification, as well as numerous local airport noise ordinances. There have been many attempts to accomplish jet exhaust noise reduction through various modifications to the exhaust nozzle of the engine. While many of these attempts have produced some degree of noise reduction, they have also resulted in adverse impacts on engine operability and/or engine operability limit related performance.

A jet noise reducing nozzle segment is typically triangular in planform and is contoured to increasingly immerse or extend into the exhaust flow with distance along its length. Multiple segments attached to the exit of a conventional exhaust nozzle are typically used to form a jet noise reducing segmented exhaust nozzle. The effective flow area of the exhaust nozzle is reduced when nozzle segments are employed due to the presence of portions of the nozzle segment projecting into the exhaust gas flow path. These portions, in effect, present additional blockage to the oncoming exhaust gas flow. On a turbofan engine, the additional blockage results in reduced fan flutter margin which can negatively impact fan aero-elastic structural stability. It also can cause increased exhaust gas temperatures which can negatively impact turbine life. Still further, it can result in reduced engine compressor stall margin which can negatively impact engine core operation stability. Individually or together, these impacts can be of such significance that they prevent the implementation of the noise-reducing device on a jet engine. This impact is particularly hard felt on older jet engine designs that have been "thrust bumped" to near their operational limits.

With ever increasing stringency of new community noise limitations, existing aircraft types currently in service, as well as new designs for future aircraft, will require new jet noise control technology. This increased stringency could potentially present a threat to the introduction of future aircraft designs. Moreover, ever stricter community noise limitations, if not addressed by suitable noise reduction technology, could impede the introduction of derivative aircraft platforms.

Accordingly, there exists a need to further reduce the noise produced by turbofan jet aircraft engines without imposing an unacceptable reduction in engine operability margins or operability limit related performance.

SUMMARY OF THE INVENTION

The present invention is directed to a segmented exhaust nozzle that effectively reduces the exhaust jet noise generated by a turbofan jet aircraft engine without adversely impacting engine operability or operability limit related performance. The exhaust nozzle is formed by a fan inner wall and a fan outer wall. The inner and outer walls cooperatively form an annular exhaust gas flow path therebetween. The walls further define a nozzle throat area and a nozzle exit area from which the exhaust gasses of a turbofan engine associated with the exhaust nozzle are emitted.

The exhaust nozzle of the present invention provides a first region in which one of the inner or outer walls curves gradually towards the other, thereby presenting reduced cross-sectional area to exhaust gas flow in this region forming an aerodynamic throat. A second region, through the segmented portion of the nozzle and downstream of the first region, is formed by the one wall curving away from the other wall to produce a region of increased cross-sectional area to exhaust gas flow. Importantly, the second region forms an exhaust gas nozzle exit area which has an effective cross sectional area approximately equal to a conventional exhaust gas nozzle exit area. This is in contrast to previously developed, segmented exhaust nozzles in which the exhaust gas nozzle exit area is smaller in cross section than a conventional exhaust nozzle exit area. This difference effectively serves to eliminate the negative impact on engine operability and operability limit related performance introduced by previous segmented exhaust nozzle configurations while still providing a significant reduction in engine jet noise.

The present invention thus reduces significantly the exhaust gas flow suppression that would typically be present with previous forms of segmented exhaust nozzles by presenting a geometric inflection through the flow control region of the nozzle. The inflective profile creates a conversion-divergent, cross sectional shape to the nozzle wall. The result is a net zero change in exhaust flow characteristic and a net zero change in segmented nozzle noise suppression effectiveness.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 1 is a highly simplified side view of an exhaust nozzle in accordance with a preferred embodiment of the present invention;

FIG. 2 is a highly simplified cross sectional view of a portion of an exhaust nozzle in accordance with section line 2—2 in FIG. 1 illustrating the curvature of the convergent/divergent segmented exhaust nozzle of the present invention;

FIG. 5 is a graph illustrating the nozzle discharge characteristic of the segmented exhaust nozzle of the present invention as compared to that of a conventional exhaust nozzle flow characteristic and the flow characteristic of previous designed segmented nozzles.

DETAILED DESCRIPTION OF THE PREFERRED EMBODIMENTS

Figure 3:
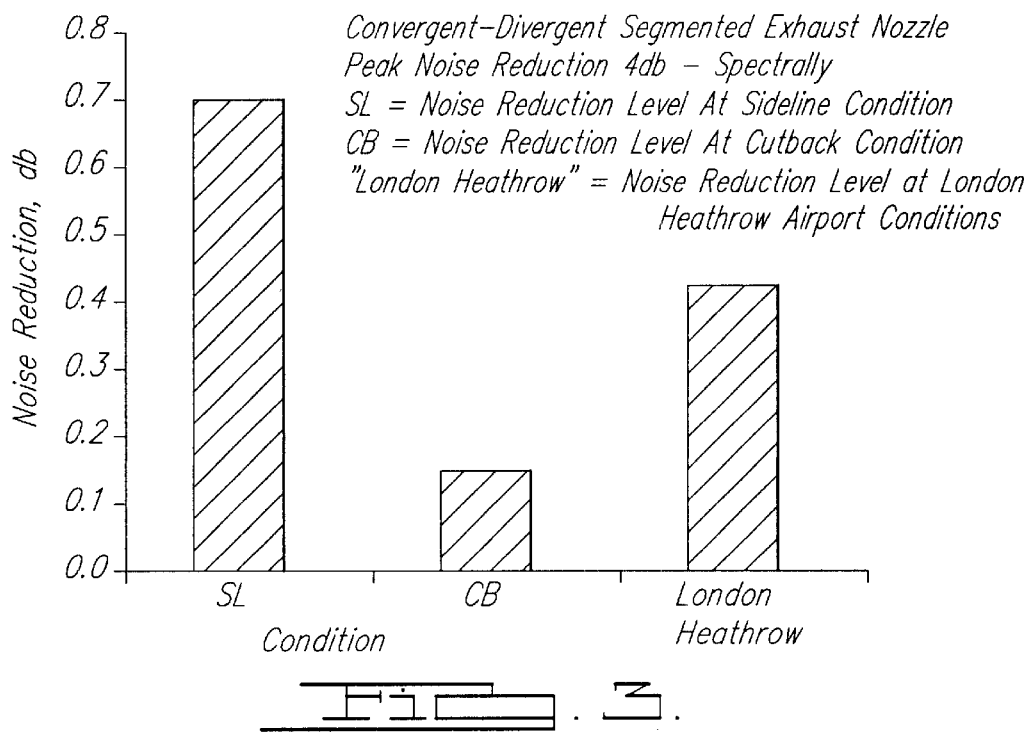
FIG. 3 is a bar graph illustrating test results for noise reduction under various operating conditions.

The following description of the preferred embodiment(s) is merely exemplary in nature and is in no way intended to limit the invention, its application, or uses.

Referring to FIG. 1, there is shown a segmented exhaust nozzle 10 in accordance with a preferred embodiment of the present invention. The exhaust nozzle 10 is particularly adapted for use with high bypass ratio turbofan jet engines. In this example, an external plug 11 is disposed within a housing structure forming a nacelle 18 along an imaginary axial center line "$C_L$" of the nacelle.

Referring to FIG. 2, there is shown a portion of the segmented exhaust nozzle 10. The segmented exhaust nozzle 10 includes a fan nozzle inner wall 12 and a fan nozzle outer wall 14 spaced apart from the inner wall 12. Cooperatively, the walls 12 and 14 form an annular exhaust gas flow path 16. The exhaust nozzle 10 is further typically contained within the nacelle 18, which also houses the turbofan jet engine (not shown).

The outer wall 14 of the segmented exhaust nozzle 10 comprises a unique contour which effectively serves to reduce the exhaust jet noise generated by the turbofan jet engine without negatively impacting the operability or operability limit related performance of the engine. The outer wall 14 includes a portion curving gradually inwardly toward the inner wall 12 from a first point 20 to a second point 22 forming an aerodynamic choke point, or choke flow control region. From point 22, the outer wall 14 changes direction and curves gradually away from the inner wall 12 to a third point 24. Thereafter, the outer wall 14 again begins to curve towards the inner wall 12 to a fourth point 26. This is the segmented region of the nozzle. Point 22 also defines the location of the exhaust nozzle throat area ("$A_{throat}$") while an integration of points 24 through 26 comprises the segmented exhaust nozzle exit area ("$A_{exit}$"). For comparison purposes, "$A_{E1}$" defines a point at which a conventional exhaust nozzle exit area would be located. Also, "$A_{E1}$ through $A_{E2}$" defines an exhaust nozzle exit area for a previously developed, typical segmented exhaust nozzle.

From FIG. 2 it can be seen that points 20–24 define a first region in which the outer wall 14 forms an arcuate protrusion which projects into the exhaust gas flow path 16. The axial distance between points 24 and 26 defines a region of increased cross-sectional area to the exhaust gas flow. It will also be appreciated that the edge of region two, points 24 through 26, provides an effective cross sectional area, represented by the imaginary line 26, which is approximately equal to $A_{E1}$, but still larger than $A_{E2}$. The entire wall structure between points 20 and 26 can be viewed as forming a geometric inflection in the exhaust gas flow path 16. The area between points 22 and 24 presents an increased cross-sectional area to the exhaust gas flow, thereby reducing blockage. The subsequent curvature back towards the inner wall 12 serves to realign the flow of exhaust gasses to maximize the nozzle noise reduction efficiency. The result is a segmented nozzle with distinct sonic and subsonic flow control regions yielding a net zero change in flow characteristic and a net zero change in segment noise suppression effectiveness of the segmented exhaust nozzle 10.

While it will be appreciated that the outer wall 14 of the exhaust nozzle 10 has been illustrated as including the geometric influction surface, it will be appreciated that this surface could also be provided on the inner wall 12 of the exhaust nozzle 10.

Referring to FIG. 3, a graph 30 illustrates the reduction in exhaust gas flow noise with the segmented exhaust nozzle 10 of the present invention during a flight test.

Figure 4:
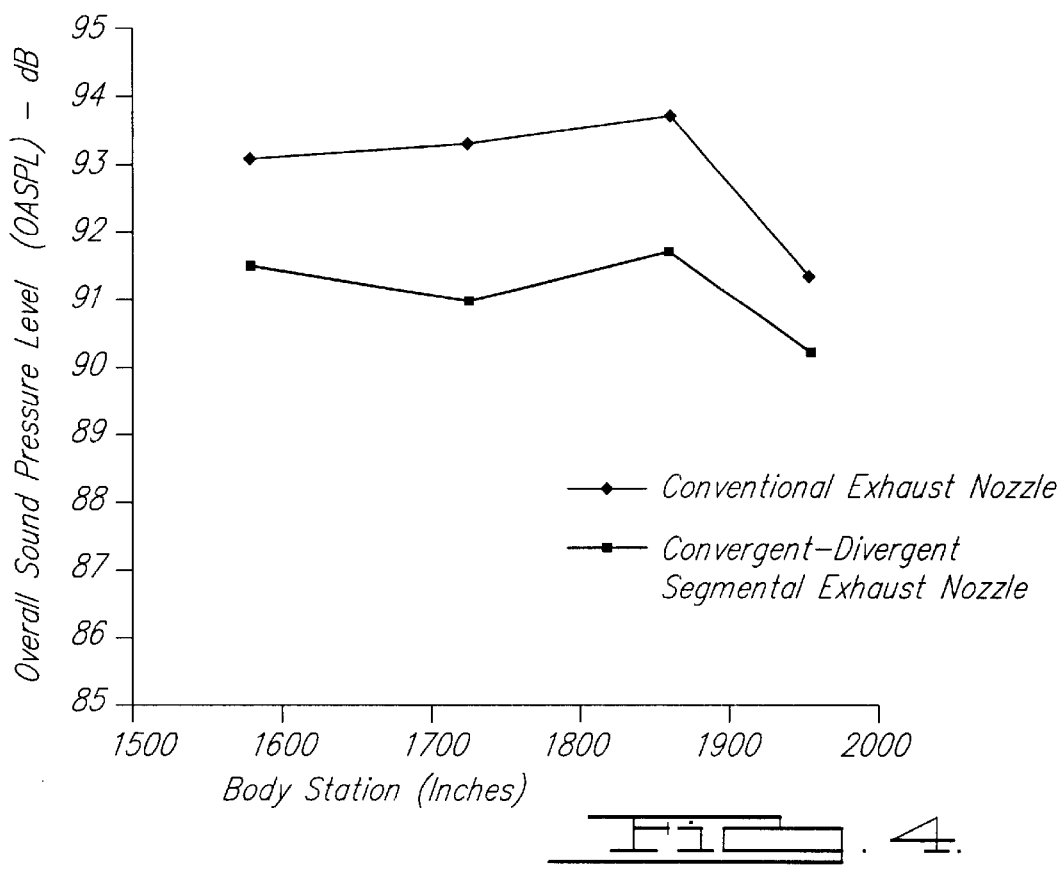
FIG. 4 is a graph illustrating the overall sound pressure level relative to a body station of an aircraft.

FIG. 4 is a graph 32 illustrating the reduction in interior noise of an aircraft incorporating the segmented exhaust nozzle 10 of the present invention.

FIG. 5 illustrates a graph 32 of the flow characteristic of the segmented exhaust nozzle 10 of the present invention as compared to a conventional exhaust nozzle flow 34 and a flow characteristic of a previously developed, segmented nozzle design 36. From FIG. 5 it will be appreciated that the flow characteristics of the exhaust nozzle 10 closely match those of a conventional exhaust nozzle.

It will be appreciated then that the segmented exhaust nozzle 10 of the present invention provides a means to significantly attenuate the exhaust jet noise produced by turbofan engines, and thus help to meet increasingly stringent community noise requirements. Importantly, the exhaust nozzle 10 does not adversely impact the operation or operability limit related performance of existing large turbofan jet engines.

The segmented exhaust nozzle 10 is further capable of being used as a segmented nozzle in exhaust nozzles having an internal primary plug, such that no inner wall is present. In such an exhaust nozzle, the outer wall 14 would curve with reference to the imaginary center line $C_L$, since no inner wall would be present.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A segmented flow nozzle for use with a jet engine to inhibit jet noise emitted from the jet engine, said flow nozzle comprising:

a circumferential nozzle inner wall;

a circumferential nozzle outer wall spaced apart from said inner wall to define an annular flow path therebetween;

one of said inner and outer walls curving toward the other to define a protrusion, at a first region of said exhaust gas flow path, which that extends into said flow path to reduce a cross sectional area of said flow path, thereby forming a choke flow control region;

said flow nozzle including a segmented region downstream of said choke flow control region;

through the segmented region of the nozzle, said one wall gradually curving away from the other, and then back toward the other, to provide an increased cross-sectional area for un-choked flow control; and a downstream edge of said segmented region defining a nozzle exit area having an effective cross sectional area approximately equal to a non-segmented nozzle exit area.

2. The nozzle of claim 1, wherein a midpoint of said segmented region defines a cross sectional area which is larger than said non-segmented nozzle exit area.

3. The nozzle of claim 1, wherein said nozzle forms an extension of an existing nozzle structure.

4. A segmented exhaust nozzle for use with a jet engine to inhibit exhaust jet noise emitted from the jet engine, said exhaust nozzle comprising:

a circumferential nozzle inner wall;

a circumferential nozzle outer wall spaced apart from said inner wall to define an annular exhaust gas flow path therebetween said circumferential nozzle outer wall, in cooperation with said circumferential nozzle inner wall, forming a plurality of spaced apart segmented regions of the exhaust nozzle;

said outer wall curving toward the inner wall, to define a arcuate protrusion that extends into said exhaust gas flow path to reduce a cross-sectional area of said annular exhaust gas flow path and thereby provide a choke flow control region along the annular exhaust gas flow path;

said segmented regions being disposed downstream of said choke flow control region;

said outer wall gradually curving away from the inner wall, and then back toward the inner wall, to define regions downstream of said arcuate protrusion for providing increased cross-sectional area for un-choked flow control to said exhaust gas flowing through said annular exhaust gas flow path; and wherein an edge of said downstream region defines a nozzle exit having an effective cross sectional area approximately equal to a non-segmented exhaust nozzle exit area.

5. The exhaust nozzle of claim 4, wherein a midpoint of said region defines a larger cross sectional area than said edge of each said region.

6. The exhaust nozzle of claim 5, wherein said midpoint defines a larger cross sectional area than said conventional exhaust nozzle exit area.

7. A segmented exhaust nozzle for use with a jet engine exhaust nozzle structure, said exhaust nozzle comprising:

a nozzle inner wall;

a nozzle outer wall spaced apart from said nozzle inner wall;

said nozzle inner and outer walls forming said exhaust nozzle and having a nozzle throat area and a nozzle exit area downstream from said nozzle throat area;

at least one of said nozzle inner and outer walls curving gradually toward the other from a first point to a second point positioned downstream of said first point, relative to flow through said jet engine, to thereby reduce a cross sectional area between said nozzle walls to form an aerodynamic throat area of said segmented exhaust nozzle;

said exhaust nozzle including a plurality of segmented regions downstream of said throat area;

through each said segmented region of the exhaust nozzle, said at least one of said walls then curving gradually away from the other from said second point to a third point downstream of said second point, relative to said flow through said jet engine, to thereby effectively increase the cross sectional area presented to the flow within said segmented exhaust nozzle, and wherein an intermediate point between said second and third points defines where a conventional nozzle exit point is located on a non-segmented exhaust nozzle;

further through the segmented region of the nozzle downstream of said third point, said at least one of said walls then curving gradually toward the other from said third point to a fourth point downstream of said third point, relative to said flow, to thereby reduce a cross sectional distance between the walls within said segmented exhaust nozzle at said fourth point; and wherein said cross sectional area integrated between said third point and said fourth point is effectively equal to a cross section area at said intermediate point.

8. The exhaust nozzle of claim 7, wherein a region between said first and second points represents an arcuate protrusion to accelerate said flow.

9. The exhaust nozzle of claim 7, wherein a region between said second and fourth points presents increased cross sectional area for subsonic flow control.

10. A segmented exhaust nozzle for use with a jet engine fan exhaust nozzle structure, said exhaust nozzle comprising:

a fan nozzle inner wall;

a fan nozzle outer wall spaced apart from said fan nozzle inner wall to form an annular exhaust gas flow path;

said exhaust nozzle having a nozzle throat area and a nozzle exit area downstream from said nozzle throat area;

said outer wall curving gradually toward the inner wall from a first point to a second point positioned downstream of said first point, relative to exhaust gas flow through said nozzle, to thereby reduce a nozzle throat cross sectional area of said exhaust nozzle and accelerate said exhaust gas flow therethrough;

said exhaust nozzle including a segmented region downstream of said second point;

through said segmented region of the nozzle, said outer wall then curving gradually away from the inner wall from said second point to a third point downstream of said second point, relative to said exhaust gas flow, to thereby effectively increase the cross sectional area presented to said exhaust gas flow within said exhaust nozzle;

wherein an intermediate point between said second and third points defines where a conventional nozzle exit point is located on a non-segmented exhaust nozzle; and said outer wall then curving gradually toward the inner wall from said third point to a fourth point downstream of said third point, relative to said exhaust gas flow; and wherein said cross sectional area integrated through said third point and said fourth point is effectively equal to a cross section area at said intermediate point.

11. The exhaust nozzle of claim 10, wherein a region between said first and third points defines an arcuate protrusion.

12. A segmented nozzle for use with a jet engine to inhibit jet exhaust noise emitted from the jet engine, said exhaust nozzle comprising:

a nozzle outer wall spaced apart from an imaginary axial center line of said nozzle;

said outer wall curving toward said imaginary axial center line to define a protrusion that extends into said exhaust gas flow path to reduce a cross sectional area of said exhaust gas flow path, thereby forming a choke flow control region;

said nozzle including a segmented region downstream of said choke flow control region;

through the segmented region of the nozzle, said outer wall gradually curving away from said imaginary axial center line, and then back toward said center line, to define said segmented region, which provides an increased cross-sectional area for un-choked flow control; and a downstream edge of said second region defining a nozzle exit area having an effective cross sectional area approximately equal to a non-segmented exhaust nozzle exit area.

13. A segmented flow nozzle for use with a jet engine to inhibit engine noise emitted from the engine, said flow nozzle comprising:

a nozzle inner wall;

a nozzle outer wall spaced apart from said inner wall to define a flow path therebetween;

one of inner and outer walls curving toward the other at a first region of said flow path to reduce a cross sectional area of said flow path; and form a choke flow control region;

the segmented region being downstream of said choke flow control region;

through the segmented region of the nozzle, one of said inner and outer walls curving away from the other, and then back toward the other, to define said segmented region such that said segmented region has said walls diverging from one another and then converging toward one another in a direction of said flow through said jet engine; and a downstream edge of said segmented region defining a nozzle exit area having a cross sectional area approximately equal to a non-segmented jet engine nozzle exit area.

14. A method for inhibiting noise emitted from a jet engine, comprising:

using a nozzle inner wall and a nozzle outer wall to form a segmented flow nozzle that provides a flow path therebetween for an exhaust flow through said jet engine;

defining a first flow region within said flow nozzle having a first cross sectional area that acts as a constriction in said flow path; and thereby forms a choke flow control region;

defining a segmented nozzle region downstream of said choke flow control region, relative to a direction of airflow through said flow path, which has a second cross sectional area and a third cross sectional area, wherein said second cross sectional area is larger than said first cross sectional area; and forming a downstream edge of said segmented nozzle region such that a nozzle exit area thereof has an effective cross sectional area approximately equal to that of a non-segmented nozzle exit area.

\* \* \* \* \*